Aug. 2, 1960  G. T. SCHJELDAHL  2,947,345
MACHINE FOR MAKING ARTICLES FROM MULTIPLE THERMOPLASTIC WEBS
Filed Oct. 8, 1958  3 Sheets-Sheet 1
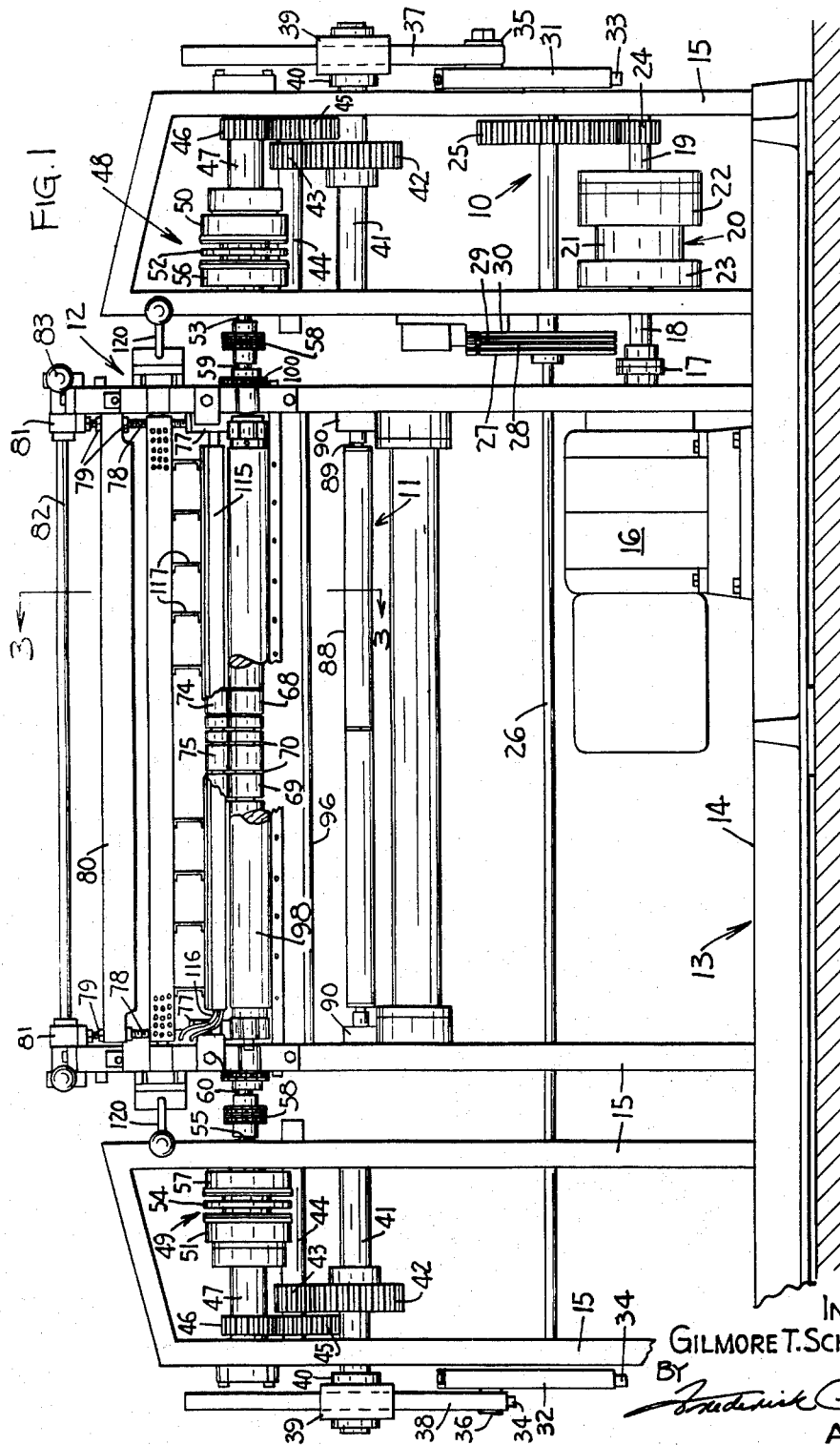
INVENTOR
GILMORE T. SCHJELDAHL
BY
Frederick C. Meyer
ATTORNEY Aug. 2, 1960     G. T. SCHJELDAHL     2,947,345
MACHINE FOR MAKING ARTICLES FROM MULTIPLE THERMOPLASTIC WEBS
Filed Oct. 8, 1958     3 Sheets-Sheet 2
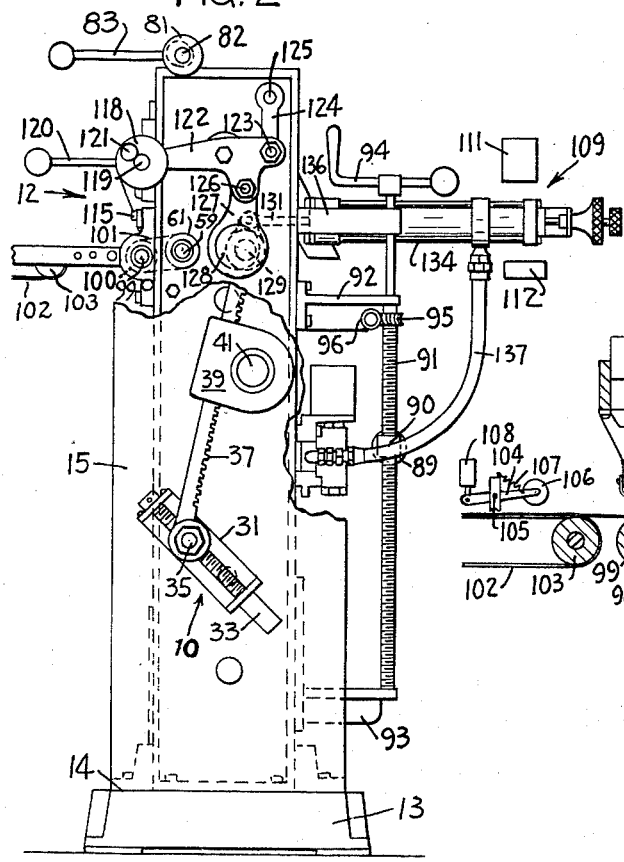
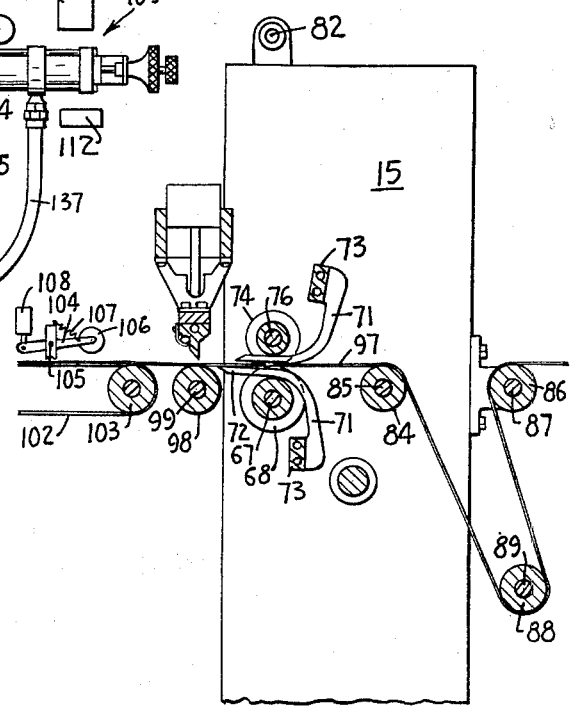
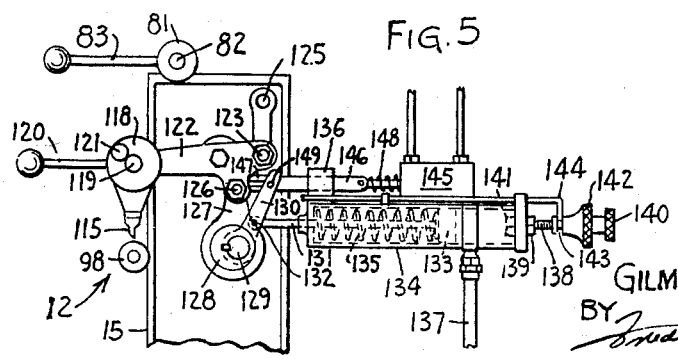
INVENTOR
GILMORE T. SCHJELDAHL
BY Frederick C. Meyer
ATTORNEY United States Patent Office 2,947,345
Patented Aug. 2, 1960

2,947,345

MACHINE FOR MAKING ARTICLES FROM MULTIPLE THERMOPLASTIC WEBS

Gilmore T. Schjeldahl, Farmington, Minn., assignor to G. T. Schjeldahl Company, Northfield, Minn., a corporation of Minnesota Filed Oct. 8, 1958, Ser. No. 766,002

10 Claims. (Cl. 154—42)

This invention relates to machinery for the manufacture of thermoplastic sheet articles, and more particularly to a side-weld machine for the multiple manufacture of plastic bags and the like.

It is an important object of the invention to provide an efficient and simplified machine for the rapid production of accurately formed articles constructed simultaneously from separate webs of thermoplastic material.

Another object of the invention is to provide a machine which will simultaneously cut and weld a plurality of bags from continuous thermoplatsic webs each run at lineal speeds independent of the other during intermittent periods and all of the webs being cut and welded during the same dwell period.

A further object of the invention is to provide a single cutting and sealing instrumentality which is accurate and fast, being capable of reproducing identical cuts and seals transversely of a plurality of independently advanced webs of thermoplastic material with the instrumentality being held under adjustably constant conditions of heat and precise positioning with respect to a single back-up roll underlying the webs to be cut and sealed.

A further object of the invention is to provide means independent of the speed of travel of the individual webs for obtaining fine adjustment of cut-off lines across a plurality of webs, each precisely on a line denoting the proper width of an article to be cut and sealed to form an individually manufactured article therefrom.

Another object of the invention is to provide a machine capable of producing, from a single intermittently operated drive shaft, a plurality of fabricated items, each requiring a separate continuous thermoplastic web advanced for a predetermined individual distance by respective sets of independent roll sections mounted on common axes and operating for substantially the same period of time, but at variable rates of speed.

A still further object of the invention is to provide drive means for a plurality of webs in a machine of the class described wherein each web, irrespective of the total distance traveled between simultaneous lateral cuts, will begin its travel at low speed, accelerate, decelerate, and then end at a low speed.

These and other objects and advantages of the invention will more fully appear from the following description, made in connection with the accompanying drawings, wherein like reference characters refer to the same parts throughout the several views and in which:

Figure 1 is a front view of the machine, portions thereof being cut away to better show the operation of the parts;

Figure 2 is a side elevation taken from the right of Figure 1, portions of the structure being cut away to show hidden parts;

Figure 3 is a somewhat diagrammatic enlarged vertical section of a segment of the rolls and hot knife taken on the line 3—3 of Figure 1;

Figure 4 is a segmented longitudinal section of a set of draw rolls, portions thereof being shown in full line;

Figure 5 is an enlarged detail view of the hot knife actuator; and

Figure 6:
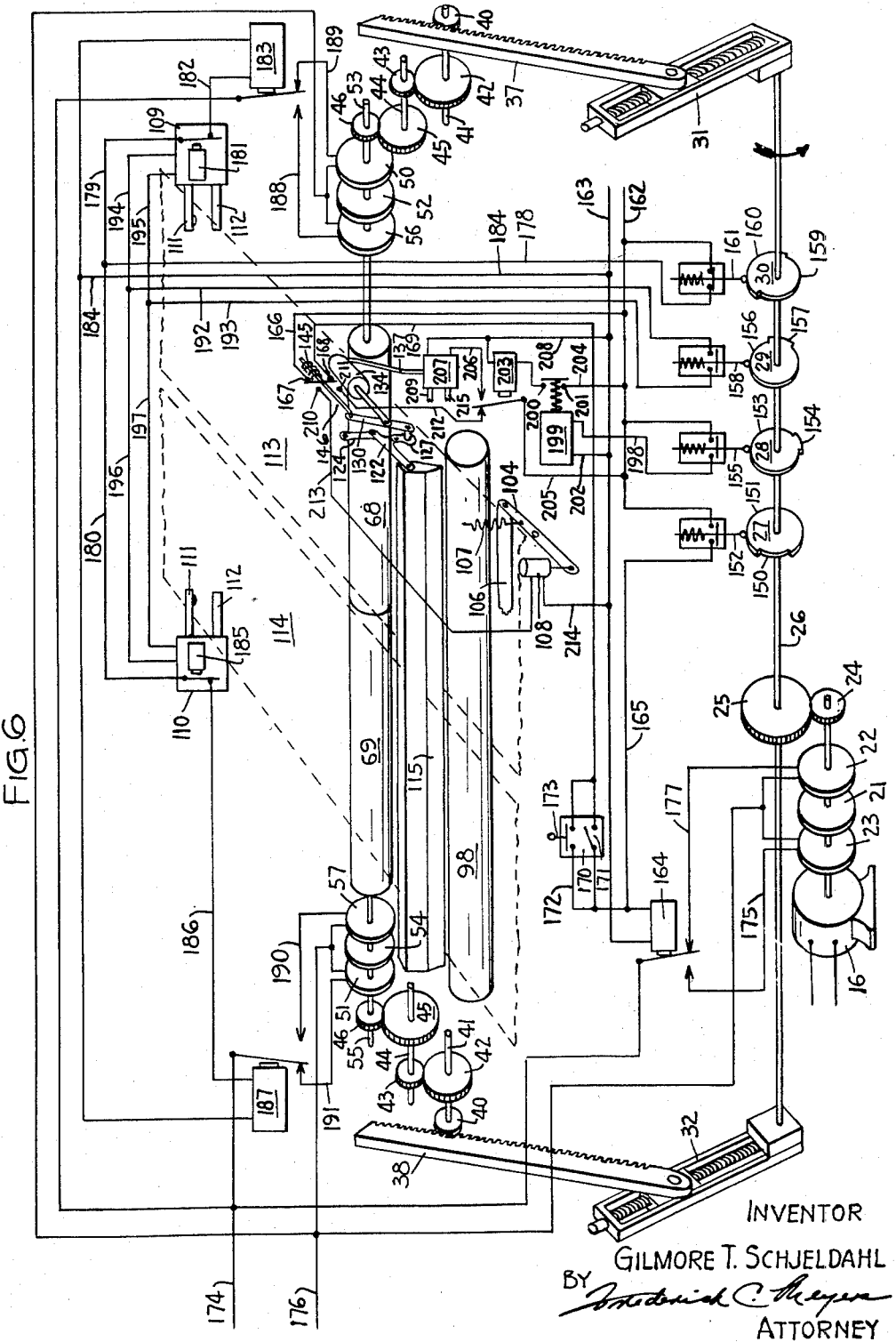
Figure 6 is a schematic wiring diagram for the machine.

Referring to Figs. 1 and 2, the machine constitutes several portions which will be treated independently herewith. The first of these is the dual intermittent engine 10, the web advancing means 11 which is driven by the dual intermittent engine, and the cutting and sealing mechanism 12 for intermittently acting upon the advancing webs when in their quiescent state.

Dual intermittent engine

The dual intermittent engine 10 is mounted upon framework 13 which comprises a base 14 and upright frame mounting members 15. Details of a single intermittent engine are set forth in copending application, Serial No. 630,157, filed December 24, 1956, and assigned to the same assignee as the instant case.

A drive motor 16 is secured to base 14 and is coupled at 17 to drive shaft 18 which, in turn, drives the input shaft 19 through the clutch brake mechanism 20. The clutch brake 20 is of conventional structure, having a core 21 rigidly secured to the input shaft 19 and either rotating with the clutch portion 22 or stopped against the brake portion 23, depending on which of the portions is energized electrically. The input shaft 19 is provided with a pinion gear 24 which, in turn, drives gear 25 and shaft 26 to which it is rigidly secured. Shaft 26 extends through the entire framework, being journaled in the outermost upright frame members 15. Secured intermediate the ends of shaft 26 are cam discs 27, 28, 29 and 30, each of which operates an electric switch as will be hereinafter described in more detail.

At each of the ends of the shaft 26 is a crank respectively designated 31 and 32. Each of the cranks is provided with respective screw adjustments 33 and 34 for radially adjusting the respective crank pins 35 and 36 at the desired radial length from the axis of shaft 26. A gear rack 37 is pivotally secured to pin 35 and a similar gear rack 38 is pivotally secured to the pin 36. At each side of the machine is a rack guide 39 and a gear 40 which is driven alternately in one direction and then in the other during the rotation of shaft 26 and its respective cranks. Each of the gears 40 is secured to a shaft 41 journaled across frame members 15 and provided with gear 42. Each of the gears 42, in turn, drives a pinion 43 secured to a shaft 44 at each side of the machine and journaled in parallel relation to shaft 41. Also secured to each of the shafts 44 is a gear 45 which, in turn, drives gear 46 secured in turn to sleeve 47 journaled across frame members 15 and connected with respective clutch brake members 48 and 49. Sleeve 47 is secured to clutch member 50 in clutch brake 48 and to clutch 51 in clutch brake 49. The core 52 in clutch brake 48 is secured to draw roll drive shaft 53 at one side of the machine while core 54 is secured to draw roll drive shaft 55 at the other side. Brake 56 in clutch brake member 48 is adapted to hold the draw roll drive 53 stationary until clutch 50 is energized, whereupon the draw roll drive 53 will rotate with the sleeve 47. Similarly, brake 57 will hold the core 54 and draw roll drive shaft 55 stationary until the brake is de-energized and clutch 51 is energized whereupon it will rotate with the sleeve 47 at the left as viewed in Fig. 1. It will be noted that the cranks 31 and 32 are in the same position with respect to the single drive shaft 26 and rotate in unison therewith. The respective racks 37 and 38, however, may be set at different radial distances from the axis of shaft 26 so that sleeves 47 at each side of the machine will rotate in unison first in one direction and then in the other but not necessarily at the same rotational speed, depending on the radial settings of the respective racks 37 and 38.

As pointed out in copending application, Serial No. 630,157, it is intended that the drive torque of the output of the intermittent engine be high at the beginning and end of the stroke. Thus, the overall length of the stroke can be controlled by the radial setting of the crank while preserving the high torque at the beginning and end irrespective of the lengths of the stroke.

*Web advancing means*

Each of the draw roll drives 53 and 55 have a coupling 58 which, in turn, are secured to the respective draw roll shafts 59 and 60. The draw roll shafts 59 and 60 are journaled in respective sides of frame 15 in axial alignment and a sprocket 61 is secured to the draw roll shaft 59 for driving another element as will be subsequently described. The draw roll assembly is shown in detail in Fig. 4. Shaft 59 is secured axially to the roller shaft 62 while shaft 60 is secured in axial alignment to the roller sleeve 63. The sleeve 63 is provided with a bearing 64 which is mounted in recessed area 65 adjacent the confronting ends of the roller members 62 and 63, as shown in Fig. 4. Another bearing 66 is provided in sleeve 63 in spaced relation with the first mentioned bearing 64 and in axial alignment therewith. A shaft 67 is secured axially to roller shaft 62 and is journaled within the bearings 64 and 66 so as to maintain the shaft 62 and sleeve 63 in aligned registry, although permitting each of them to be rotated independently through their respective shafts 59 and 60. A resilient drive roll 68 surrounds the shaft 62 and a similar drive roll 69 surrounds the sleeve 63. Each of the drive rolls 68 and 69 are provided with a series of spaced circumferential slots 70, each of which is adapted to retain a finger 71, as shown in Fig. 3. The fingers 71 each terminate in a forwardly bent end portion 72 to prevent web material from clinging to the drive rolls 68 and 69 and wrapping themselves therearound. Fingers 71 are each secured to mounting bar 73 which is secured across the frame members 15 adjacent drive rolls 68 and 69.

The axially aligned rolls 68 and 69 constitute the lower set of driving rolls and are adapted to contact respectively an upper set of rolls having sections 74 and 75, as shown in Figs. 1 and 3. The upper set of rolls is constructed in the same manner as the lower drive rolls, each of the sections 74 and 75 being provided with similar circumferential slots 70 for receiving inverted fingers 71 and lying in confronting relation with respect to the lower fingers of the axially aligned draw rolls 68—69. The upper rolls 74 and 75 are provided with an alignment shaft 76 which keeps the roll sections in side-by-side alignment, but permits them to rotate independently. The ends of shaft 76 project outwardly and are journaled respectively in slide bearings 77 which are slidably mounted at each side of the machine on frame 15. Depending threaded rods 78 are secured to the respective slide bearings 77 and pass through lock nuts 79 which, in turn, secures the rods 78 to cross brace 80, as shown in Fig. 1. The upper ends of the rods 78 are secured to respective collars 81 at each side of the machine and these collars in turn are eccentrically mounted upon shaft 82 journaled across the frame 15. Shaft 82 has a forwardly extending handle 83, as shown in Figs. 1 and 2, which, when raised, rotates the eccentrically mounted collars 81 and causes the slide bearings 77 and the upper axially aligned draw roll sections 74 and 75 to be released from pressure engagement with the draw roll sections 68 and 69.

Another axially aligned roll assembly 84 lies parallel to the draw roll sections 68 and 69, as shown in Fig. 3, and is rotatably mounted on shaft 85 journaled across the frame 15 to permit independent rotation thereof, as previously described. A further roll assemblage 86 is journaled on a shaft 87 which is on substantially the same plane as shaft 85 and provided with independently rotating portions as heretofore described.

A synchronizing roll assemblage 88 having the same divided independent rotating sections as heretofore described is journaled on a shaft 89 which, in turn, is mounted upon a pair of blocks 90, one at each end of shaft 89. The blocks 90 in turn are threadedly mounted upon a vertical screw rod 91 mounted for rotation between the vertically spaced brackets 92 at the upper portion of frame 15 at each side thereof and brackets 93 at each side of the lower portion of frame 15, as shown in Figs. 1 and 2. At the upper end of one of the screw rods 91 is an adjusting crank 94 which causes the mounting block 90 to raise or lower, depending upon the direction of rotation. Each of the screw rods 91 is provided with a gear 95 and is drivably interconnected through the worm drive 96. The synchronizing roll assembage 88 is thus caused to raise and lower in parallel relation with the other sets of rolls previously described. The web line is indicated by 97 in Fig. 3, a web or folded web being trained along the web line for each of the roll assemblage sections. The web line 97 passes from a horizontal position over roll 86, downwardly around the synchronizing roll 88, back to overlie the roll assemblage 84 and then through the split draw rolls and between the upper and lower fingers 71, as shown in Fig. 3.

Also in alignment with the draw roll sections 68 and 69 is a single back-up roll element 98 for cutting and sealing webs. Roll 98 is tough and resistant to heat and has its upper circumference substantially on a horizontal plane with that of the draw roll sections 68 and 69 with the web line 97 passing thereover. The cutting and sealing roll 98 has a central shaft 99 which is journaled across the upright sides of frame 15 and extends beyond, as shown in Fig. 1, at the right side of frame 15. A sprocket 100 is secured to the outer extension of shaft 99 and is drivably interconnected with the sprocket 61 by means of roller chain 101. Thus, whenever draw roll section 68 and its draw roll shaft 59 rotates, the cutting and sealing roll 98 will also rotate in the same direction. Since the single roll 98 is driven at only one of its ends, namely that associated with the drive roll section 68, the feeding of web material over the roll 98 will be facilitated if the crank 31 be selected as having the longer of two radial settings with respect to cranks 31 and 32. The cutting and sealing roll 98 will thus always rotate fast enough to accommodate the web which is traveling at the greater rate of speed. Where both of the draw roll sections 68 and 69 are intended to operate at the same speed, the radial settings will be the same and, hence, the selection will make no difference.

Forwardly of the cutting and sealing roll 98 is an endless delivery belt assembly 102 which is trained about roller means 103 to pick off severed and sealed articles from the roll 98, as shown in Fig. 3. A rocking frame 104 is pivotally mounted at 105 just above the upper stretch of belt 102 and carries a pick-off roller 106 normally biased out of contact with belt 102 but depressible at the end of cutting and sealing of an article so as to pull it away from the roll 98 and cause it to travel on belt 102. Frame 104 is biased upwardly by means of the spring 107 and is caused to lower the roller 106 whenever solenoid actuator 108 is energized, as will be hereinafter described in detail. Further disposition of articles which have been picked off the roll 98 is not treated in this specification, and structural details are, hence, omitted.

Also forming a part of the web advancing means is the electric eye control system, operation of which will be described in detail subsequently. It is intended that the web material be provided with spaced markings capable of actuating the electric eye mechanisms 109 and 110, as shown in Figs. 2 and 6. These electric eye members are mounted on frame 15 rearwardly of roll assemblage 86 so that each has a lamp 111 above the web line 97 at opposed outer margins thereof and a photo-sensitive cell 112 underneath the respective web margin and light 111. The synchronizing roll assemblage 88 is raised or lowered until a cutting and sealing line is properly positioned over the roll 98. Where the crank settings 31 and 32 cause separate sheets 113 and 114 to travel along web line 97 at different rates of speed and, hence have misaligned relation rearwardly of the roll assemblage 86 in order to have synchronized relation when they reach the single cutting and sealing roll 98, it is understood that a separate synchronizing roll 88 may be provided for each of the webs 113 and 114. Also, a synchronizing roll assemblage 88 may be employed to obtain an average setting between the two webs, following which the electric eye assemblies 109 and 110 may be individually adjusted forwardly or rearwardly on frame 117 to synchronize the electric eye responses with the simultaneous stopping of webs 113 and 114 with their cut-off lines properly aligned on roll 98.

*Cutting and sealing mechanism*

In order to properly cut and seal the webs 113 and 114 in a simultaneous operation, a single straight hot knife blade 115 overlies the cutting and sealing roll 98 normally in spaced relation and is adapted to be depressed thereagainst when the webs 113 and 114 have been advanced to their proper positions on roll 98. Hot knife 115 is heated to a constant temperature through electric leads 116 from a controlled source of energy, not shown. Hot knife 115 has a latticed frame mounting 117 so constructed as not to permit accumulation of heat or the development of unevenly heated areas along the length of the blade 115. The knife 115 is caused to slide vertically with respect to frame 15 and in guided relation therewith. The frame 117 is eccentrically mounted at a side of the machine to a pivot block 118, the pivot block 118, in turn, being secured to a shaft 119, as shown in Fig. 2. A handle 120 is secured forwardly on each of the pivot blocks 118 so that, when either handle 120 is raised, the knife 115 will be raised because of its eccentrically mounted position 121 on each of blocks 118. Thus, when the handles 120 have been raised, the knife blade 115 will be kept upwardly in spaced relation with the roll 98 at all times. The shaft 119 is rotatably mounted adjacent each end in arm 122, the latter being pivotally suspended at 123 from a link 124, in turn pivotally mounted at a fixed position 125 at corresponding sides of the frame 15. On each of the arms 122 between the pivot points 119 and 123 is pivotally secured at 126 a depending yoke 127 which, in turn, rides loosely upon an eccentric 128, as shown in Figs. 2 and 5. Eccentrics 128 are secured in the same relative position to a shaft 129 which extends across the frame sides 15 and operates simultaneously. A crank arm 130 is secured to shaft 129 so that, whenever the crank 30 is moved counterclockwise for a short distance, the yoke 127 will be permitted to lower at each position and will permit the knife 115 to descend toward the roll 98. If the handles 120 are in lower position, the hot knife 115 will actually contact the roll 98 and press thereagainst with its own weight suspended thereon. Bearing pressure will then be removed from each of the yokes 127 and its corresponding eccentric 128. In practice, a small clearance such as one-sixteenth of an inch is sufficient to permit the knife blade 115 to rest its weight upon roll 98 without being forced downwardly thereagainst.

The crank 130 is actuated by a piston rod 131 which is pivotally connected thereto at 132. The piston rod 131, in turn, is connected to a piston 133 which is slidably received within the hydraulic cylinder 134. A compression spring 135 biases the piston 133 normally rearward so as to maintain the crank 130 rearward and the knife blade 115 in raised position. Cylinder 134 is rigidly mounted to a bracket 136 which, in turn, is secured to frame 15. A hydraulic inlet tube 137 communicates with the rear end of the cylinder 134 for causing the piston to move forwardly against compression spring 135. Upon release of pressure, the spring 135 will cause the piston to return and force fluid outwardly through the tube 137. An adjustably abutment screw 138 is threadably mounted in the rear end 139 of the cylinder 134 and has a thumb nut 140 at the outer end thereof for adjusting the abutment stop 141 which, in turn, determines the rearmost position of piston 133 under baising influence of compression spring 135. Another nut 142 has an annular groove 143 which is adapted to slidably receive a yoke 144 as shown in Fig. 5. The yoke 144 extends forwardly in bracketed sliding engagement with the cylinder 134 and has mounted thereon a switch 145 which is operated by an actuator 146 having a bifurcated forward end 147 and normally biased forwardly by compression spring 148. Crank arm 130 carries a pin 149 which is received in the bifurcated portion 147 of the switch actuator 146. When the arm 130 and piston 133 are biased rearwardly, the switch 145 will establish one circuit while, when moved forwardly under the pressure of hydraulic fluid in line 137, will establish another circuit, as will be described in detail under the operation of the machine.

*Electrical circuit and operation*

Referring now to Fig. 6, it is assumed that the machine is intended to be set up for the side welding of bags from two independent folded webs 113 and 114 which have been properly positioned on the independently rotatable roll system, the folded web 113 being advanced by the draw roll section 68, and the folded web 114 being advanced by draw roll section 69. Electric eyes 109 and 110 are properly positioned so as to be responsive to recurrent markings or designs which may appear sequentially in the web material and be characteristic of a specific location in each bag to be formed. Hot knife 115 will be maintained in a constant temperature suitable for cutting and welding the particular thermoplastic webbing and thickness which comprises the folded webs 113 and 114. The main drive motor 16 is constantly energized and rotates the main drive shaft 26 through gears 24 and 25 whenever the electric clutch 22 is energized and imparts no rotation whatsoever to main shaft 26 whenever the clutch 22 is de-energized and the brake 23 is energized. Cams 27–30 all are fixed to, and rotate with, shaft 26 to establish certain sequence of operation, as will be subsequently described. Cranks 31 and 32 are also fixed to a shaft 26 in parallel alignment and rotate simultaneously whenever the shaft 26 rotates. For purposes of illustration, it may be assumed that gear rack 37 has been adjusted for greater radial throw on the crank 31 than has the gear rack 38 with respect to its crank 32. Hence, output shafts 53 and 55 will rotate simultaneously first in one direction and then in the other, but shaft 53 will rotate a greater number of revolutions in the same period of time that output shaft 55 rotates in the same direction. A cycle in the operation of the machine includes one complete rotation of the main shaft 26 beginning with the crank arms 31 and 32 in upright position and in alignment with their respective gear racks 37 and 38. Thus the position illustrated in Fig. 6 is just subsequent to the beginning of the cycle where the crank arms have progressed a short distance from the beginning point. Cam wheel 27 has a low circumferential portion 150 and a high portion 151, one of which is in constant engagement with the spring-pressed cam following switch 152 at the dead center or beginning position of the crank arms 31 and 32. The switch 152 will have just climbed to the higher peripheral portion 151 to close the cam switch 152. Cam wheel 28 is similarly provided with a low circumferential portion 153 and a high portion 154. Cam wheel 28 is adapted to actuate the spring-pressed cam following switch 155 so that the switch will be closed when the high portion 154 is in contact therewith. Similarly, the cam wheel 29 has a low portion 156 and a high portion 157 and the cam wheel 29 is adapted to actuate the spring-pressed cam following switch 158. Cam wheel 30 has a low circumferential portion 159 and a high portion 160 adapted to sequentially operate the spring-pressed cam following switch 161. Cam wheel 27 controls the clutch brake system 22, 23, and cam wheel 30 controls the clutch brake systems 50, 56 and 51, 57 which, in turn, drive the respective draw roll sections 68 and 69.

Cam wheel 28 initiates the cutting and sealing movement of hot knife 115 and a timing cycle which determines the dwell period thereof. Cam wheel 29 shorts out each of the electric eyes 109 and 110, thereby preparing each of them for an electric eye response for the particular cycle.

A source of solenoid operating current is supplied through the alternating current lines 162 and 163. With the crank arms 31 and 32 aligned with the racks 37 and 38, cam switch 152 will not have yet climbed to the high portion 151 and, hence, will remain open. In this condition, there is no energization of solenoid switch 164 through conductor 165 and back to the neutral line 163. A parallel circuit, however, may be established through the line 166 through normally closed contact point 167 and 168, through conductor 169 and through switch 170, through solenoid switch 164 and back to the neutral line 163. Switch mechanism 170 has a master switch 171 to energize solenoid switch 164 from the conductor 169 and is also provided with a short bypass line 172 which can be temporarily closed by means of the thumb button 173. With the switch 171 manually opened, the thumb button switch 173 may be depressed for producing a single cycle which is particularly useful for test purposes. It will be noted that just prior to the beginning of a cycle with the crank arms 31 and 32 aligned with their respective gear racks 37 and 38, the cam wheel 30 will not yet have closed the switch 161, but is about to do so.

In order to start the machine in operation, the switch contacts 167 and 168 will be closed and, if it is desired to utilize but a single cycle, then switch 171 will be left in open position. The thumb button switch 173 is then depressed so as to momentarily close the circuit from line 169 through conductor 172 to the solenoid switch 164 and then back to the neutral line 163. Prior to energization of the solenoid switch 164, a direct current circuit was established from line 174 through conductor 175, electric brake 23, and back to the other direct current line 176. The main shaft 26 was thus rigidly held against rotation. However, upon energization of the solenoid switch 164, brake 23 is de-energized and a new circuit is established from direct current line 174 through conductor 177, electric clutch 22 and back to the other direct current line 176. With the clutch energized, the constantly rotating motor 16 now causes the shaft 26 to rotate in the direction of the arrow and to move the cams and the cranks to the position illustrated in Fig. 6, which is the instantaneous position assumed just subsequent to energization of the clutch 22.

As soon as cam 27 begins to rotate, the upper portion 151 thereof closes the cam switch 152 and establishes an independent circuit from the line 162 through solenoid switch 164 and back to the neutral line 163. The shaft 26 will continue to turn as long as the cam switch 152 rides upon the high portion 151 of cam 27, and this is true whether or not the manual switch 171 and the button switch 173 are opened, or whether the cylinder switch points 167 and 168 are open. Toward the end of one revolution of the shaft 26, however, the cam following switch 152 will drop back to the lower circumferential portion 150 and automatic sequence will be established only if the manual switch 171 is closed and the cylinder switch contacts 167 and 168 are closed or will become closed. If they are closed, the shaft 26 will rotate continuously irrespective of the condition of cam following switch 152. If the contacts 167, 168 are temporarily opened, then the shaft 26 will stop and a predetermined period of time will be inserted into the cycle until the contacts 167 and 168 are again closed.

Simultaneously with the closing of cam switch 152, the cam switch 161 will also ride up to the high portion 160 of the cam wheel 30. The line 178 will thus become energized and will divide into two parallel circuits through conductors 179 and 180. Conductor 179 connects with the normally closed solenoid switch 181 through conductor 182 to energize solenoid switch 183 and complete its circuit through the lead 184 and back to the neutral line 163. Similarly, cam switch 161, when closed, will complete a circuit to conductor 180, solenoid switch 185, conductor 186, to energize the solenoid switch 187 and then return to the lead 184 and neutral line 163. It will be noted that solenoid switch 181 lies within the electric eye unit 109 while the solenoid switch 185 lies within the electric eye unit 110. Until triggered, the solenoid switches remain closed, and permit the energization of solenoid switches 183 and 187, respectively.

Prior to the energization of solenoid switch 183 a direct current circuit was established from line 174 through conductor 188, through electric brake 56 and back to the other direct current line 176. The draw roll section 68 was thus rigidly held against rotation while the shaft 53 was permitted to complete its rotation in the opposite direction during the upward stroke of the gear rack 37. However, as soon as the solenoid switch 183 was energized, a new direct current circuit was established from line 174 through conductor 189, electric clutch 50, and back to the other direct current line 176. The instant the brake 56 was de-energized and clutch 50 was energized, the draw roll section 68 begins to rotate in the direction to advance the folded web 113. Similarly, just prior to energization of the solenoid switch 187, a direct current was established from the line 174 through conductor 190, electric brake 57, and back to the other direct current line 176. Draw roll section 69 was thus held rigid until the solenoid switch 187 was energized. The brake 57 was then de-energized and the clutch 51 energized through a direct current circuit from line 174 through conductor 191 and back to line 176. Since the solenoid switches 183 and 187 were energized at precisely the same instant, the draw roll sections 68 and 69 will always start their rotation simultaneously. Unless otherwise interrupted, they will likewise simultaneously stop their rotation when the cam switch 161 drops from their high portion 160 of cam wheel 30 to the lower circumferential portion 159. It will be remembered, however, that during these equal intervals the draw roll section 68 travels a greater distance than the roll 69 and, hence, a greater lineal length of the folded web 113 will be advanced during the same period of time than that of the folded web 114.

While the draw roll sections 68 and 69 are still rotating prior to the opening of cam switch 161, the high portion 157 of cam wheel 29 will close the cam switch 158. Cam switch 158 closes a circuit between the conductor 192 and 193, thus shorting the leads 194 and 195 for re-setting the photo-sensitive element 112 so that interruption of the light rays from light 11 will de-energize the solenoid switch 183 and likewise de-energize clutch 50 and establish the electric brake 56. Thus, it is possible, through electric eye marking, to stop the continued travel of folded web 113 slightly prior to the distance it would have traveled had the draw roll section 68 relied solely upon the cam wheel 30 for its operation. This feature is important in that slight inaccuracies in the printing of the web material 113 or slight tensions or other physical factors which may cause stretching or shrinking of the web material may be compensated for spontaneously and automatically. The electric eye unit 110 performs the same function for the other draw roll section 69, operating completely independently of electric eye 109 to adjust the length of web 114 just short of the distance it would have traveled solely under the influence of cam wheel 30. At the same time cam wheel 29 closes switch 158 to short-out and reset electric eye 109, the electric eye 110 is also reset through a parallel circuit including conductors 196 and 197. At all events, both the draw roll sections 68 and 69 will be rigidly stopped when the cam switch 161 falls to the lower circumference 159 and opens the circuits.

Not until the draw rolls 68 and 69 are completely stopped will the high portion 154 of cam wheel 28 close the cam switch 155. When switch 155 is closed, a circuit will be established from line 162, through conductor 198 to energize the timer 199 and simultaneously close the switch contacts 200 and 201, the circuit being completed through the conductor 202 back to the other line 163. Timer 199 will maintain switch contacts 200 and 201 closed for a predetermined length of time, during which the solenoid switch 203 will be energized through the conductor 204 and back to line 163. With the solenoid switch 203 energized, a circuit will be established from line 162 through conductor 205, lead 206, solenoid-operated three-way hydraulic valve 207, conductor 208 and back to the neutral line 163. Hydraulic fluid will then flow from pressure line 209 through valve 207 and into the fluid connecting line 137 to lower the hot knife 115 against sealing roll 98 and thereby simultaneously to cut and seal both of the folded webs 113 and 114.

As soon as hot knife 115 is lowered, the switch actuator 146 will break the contacts 167, 168, and hence interrupts current through line 169 and to the solenoid switch 164. However, it will be remembered that the cam switch 152 still remains on the high circumferential portion 151 of cam wheel 27 and, hence, an independent circuit will be maintained to the solenoid switch 164 and shaft 26 will continue to turn in its cycle of revolution. If actuator 146 moves forwardly under influence of compression spring 148, a new circuit will be established through contact points 210 and 211 which provides a circuit through conductors 212 and 213 to energize the solenoid actuator 108. The remainder of the circuit is through the lead 214 which connects with the neutral line 163. However, even with the contacts 210, 211 established, the timer 199 will still maintain contact through points 200, 201 so that solenoid switch 203 maintains the solenoid valve 207 energized while solenoid actuator 108 is not yet energized. As soon as the predetermined time period of timer 199 has elapsed, contacts 200, 201 will be broken and the solenoid switch 203 will re-establish the circuit through conductors 205, 212, contact points 210 and 211, conductor 213, through solenoid actuator 108 and return lead 214. Solenoid actuator 108 will then be energized and rock the pick-up frame 104 about the pivot point 105 and against tension spring 107 so as to bring roller 106 into contact with pick-up belt 102 and strip a cut and welded article away from hot knife 115 and roll 98.

Since the timing cycle is completed and the solenoid switch 203 is de-energized, the circuit to the three-way solenoid valve 207 will also have been interrupted so that fluid pressure from the conduit 209 through 137 will have been interrupted and the valve now turned so as to establish a fluid passage between conduit 137 and exhaust line 215. Since the hydraulic piston 133 is normally biased to the closed position by compression spring 135, hydraulic fluid will be forced back through the conduits 137 and 215 where it will be later recycled. The lag in the operation of the solenoid-actuated valve 207 is sufficient to retain a momentary contact across the points 210 and 211 and thereby to cause the solenoid actuator 108 to flick the roll 106 against the completed sheet article and start it on its travel on conveyor belt 102.

If the timed period of timer 199 is such that contact points 200 and 201 are opened during the period of a revolution of shaft 26 where the cam switch 152 still remains on the upper circumferential portion 151 of cam wheel 27, then the switch 145 will have re-established contact between the points 167 and 168 so that the independent circuit through conductors 166 and 169 will be re-established with manual automatic switch 171 closed. Thus, the solenoid switch 164 is maintained energized to keep the main drive shaft 26 in constant rotation to repeat another revolution and another web-advancing, cutting and sealing cycle to produce a pair of finished articles.

Now suppose that the speed of main shaft 26 has been increased or the timing period of timer 199 increased to provide a longer dwell period for cutting and sealing the web material. Then a situation may arise where cam switch 152 rides off the high circumferential portion 151 of cam wheel 27 and becomes opened as it drops to the lower circumferential portion 150 before the timer contacts 200, 201 have been opened. Now the hot knife 115 will not yet have risen from roll 98 and contacts 167, 168 will still be opened. Also, the independent circuit from line 162 through cam switch 152 will be open and solenoid switch 164 will, hence, become de-energized. The direct current circuit from line 174 through conductor 177, clutch 22 and back to line 176 will then become interrupted to dis-establish driving connection between motor 16 and the main drive shaft 26. Instantaneously therewith, the electric brake 23 will stop rotation of shaft 26 because the solenoid switch will have established the circuit from line 174 through conductor 175, electric brake 23 and back to line 176. The cam switch 152 will remain open since the shaft 26 has stopped with the switch responsive to the lower cam portion 150 of cam wheel 127. The effect of the foregoing situation is to introduce an additional dwell time into the period of a cycle without varying the established period or sequence for other events which occur during the revolution of shaft 26. When timer 199 opens the contacts 200, 201, then the hot knife 115 will be raised and the parallel circuit through contact points 167, 168 of cylinder switch 145 will be re-established to start the main shaft 26 rotating through another revolution and to repeat the entire sequence of operations associated with a single revolution of the shaft.

It should be noted that it is impossible to cause the shaft 26 to begin rotating until the hot knife 115 rises, since only under the latter circumstance can the contacts 167 and 168 be established.

Since the entire operation of the machine is keyed to a single hot knife, it becomes possible to maintain the knife at a pre-selected constant temperature and hold that temperature throughout a multiplicity of cycles. If the requirements for cutting and sealing time become greater, the required time period is merely inserted into the cycle without requiring corrective adjustment for the other functions of the machine. In this manner, multiple webs may be fed at different rates over the independent roll advancing system so as to simultaneously manufacture articles of different width, yet always cutting and sealing the side edges of the articles under identical circumstances.

It will, of course, be understood that various changes may be made in the form, details, arrangements and proportions of the invention without departing from the scope thereof as set forth in the appended claims.

What is claimed is:

1. A side-weld machine for a plurality of thermoplastic webs comprising in combination, a plurality of independently movable web-advancing means, a single drive adapted intermittently to impart simultaneous movement and simultaneous quiesence to said web-advancing means, the movement of each being at a predetermined independent rate of speed, said web-advancing means each causing a web to move into side-by-side alignment, a single knife element positioned beyond the web-advancing means in the direction of travel of each web, and means adapted to bring said single knife element into simultaneous cutting engagement with all of the webs when in a quiescent state.

2. The structural combination set forth in claim 1, and means heating said knife to a constant and uniform temperature.

3. The structural combination set forth in claim 1, and a single back-up element positioned oppositely the knife element for contact therewith during simultaneous cutting of a plurality of webs.

4. The structural combination set forth in claim 1, wherein the web-advancing means constitute independent roll sections rotating side-by-side on a common axis and at independently variable rates of speed.

5. In a side-welding machine for making articles from superposed layers of thermoplastic web material, mechanism having means adapted to advance a pair of layered webs, each independently of the other and at respectively predetermined rates of speed, means adapted to cause the pair of layered webs to be stopped intermittently in their forward travel and in side-by-side relation, a unitary hot knife disposed transversely of the webs, and mechanism adapted to relatively move said hot knife into contact simultaneously with said pair of webs whereby to cut and seal a side edge of two articles, each having its own predetermined width between side edges.

6. In a side-welding machine for making articles from superposed layers of thermoplastic web material, mechanism having means adapted to advance a pair of layered webs each independently of the other and at respectively predetermined rates of speed, means adapted to cause the pair of layered webs to be stopped intermittently in their forward travel, a cutting roll supporting both of the layered webs in side-by-side relation, a unitary hot knife disposed transversely of the webs and longitudinally of the cutting roll, and mechanism adapted to move said hot knife into contact with said pair of webs and against said cutting roll whereby to cut and seal a side edge of two articles, each having its own predetermined width between side edges.

7. In a side-welding machine for making articles from superposed layers of thermoplastic web material, mechanism having means adapted to advance in side-by-side relation a pair of layered webs, each independently of the other and at respectively predetermined rates of speed, means adapted to normally cause the pair of layered webs to be simultaneously stopped in their forward travel, a pair of electric eye controls scanning each layered web and adapted to stop the same slightly prior to its normal stopping time whereby to adjust the proper width of each article, a unitary hot knife disposed transversely of the layered webs, and mechanism adapted to relatively move said hot knife into simultaneous contact with said pair of layered webs whereby to cut and seal a side edge of two articles.

8. In a side-welding machine for making articles from superposed layers of thermoplastic web material, mechanism having means adapted to advance a pair of layered webs, each independently of the other and at respectively predetermined rates of speed, means adapted to cause the pair of layered webs to be stopped intermittently in their forward travel and in side-by-side relation, a unitary hot knife disposed transversely of the webs, a cutting roll supporting both of the layered webs in side-by-side relation, mechanism adapted to relatively move said hot knife into contact simultaneously with said pair of webs whereby to cut and seal a side edge of two articles, each having its own predetermined width between side edges, and means adapted to pull both articles away from the knife and cutting roll after the side edges are cut and sealed.

9. A machine for making articles from thermoplastic webs comprising a plurality of side-by-side of independently movable web advancing mechanisms, a heated blade element lying transversely of the pathways of travel of all of the webs and adapted to move into simultaneous engagement with and disengagement therefrom, a single drive powering all of said independently movable web advancing mechanisms, means stopping the advance of each web when it has travelled thru a predetermined independent distance relative to said heated blade element, and means moving said heated blade element into engagement with all of the webs when stopped relatively thereto.

10. The machine set forth in claim 9 wherein the means stopping the advance of each web is an electric brake, and an electric eye assemblage adapted to actuate each electric brake respectively, each said electric eye assemblage being mounted in adjustably fixed position on said machine whereby to scan an imprinted web when advancing relative thereto.

References Cited in the file of this patent
UNITED STATES PATENTS

| | | |
|---|---|---|
| 889,746 | Bechman | June 2, 1908 |
| 1,860,984 | Bodge | May 31, 1932 |
| 2,726,706 | Hakomaki | Dec. 13, 1955 |
| 2,730,160 | Pickering | Jan. 10, 1956 |
| 2,882,956 | Weist | Apr. 21, 1959 |